(12) United States Patent
Lin et al.

(10) Patent No.: US 11,500,228 B1
(45) Date of Patent: Nov. 15, 2022

(54) ELECTRONIC DEVICES WITH SHEET-PACKED COHERENT FIBER BUNDLES

(71) Applicant: Apple Inc., Cupertino, CA (US)

(72) Inventors: Wei Lin, Santa Clara, CA (US); Chih-Yao Chang, Taipei (TW); Nathan K. Gupta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 17/156,139

(22) Filed: Jan. 22, 2021

Related U.S. Application Data

(60) Provisional application No. 62/990,375, filed on Mar. 16, 2020.

(51) Int. Cl.
| | | |
|---|---|---|
| *G02F 1/01* | (2006.01) | |
| *F21V 8/00* | (2006.01) | |
| *G02B 6/02* | (2006.01) | |
| *G02B 6/36* | (2006.01) | |

(52) U.S. Cl.
CPC .......... *G02F 1/0115* (2013.01); *G02B 6/0078* (2013.01); *G02B 6/02004* (2013.01); *G02B 6/3604* (2013.01)

(58) Field of Classification Search
CPC ....... G02B 6/0078; G02B 6/3604; G02B 6/02
See application file for complete search history.

(56) References Cited

U.S. PATENT DOCUMENTS

| | | | |
|---|---|---|---|
| 4,022,647 A | 5/1977 | Yevick | |
| 4,138,193 A | 2/1979 | Olszewski et al. | |
| 4,630,887 A | 12/1986 | Taylor | |
| 6,487,351 B1 * | 11/2002 | Cryan | G02B 6/08 385/120 |
| 11,215,752 B1 * | 1/2022 | Lin | G02B 6/08 |
| 11,247,421 B1 * | 2/2022 | Gulgunje | G02B 6/08 |
| 2002/0168157 A1 | 11/2002 | Walker et al. | |
| 2005/0265675 A1 | 12/2005 | Welker et al. | |
| 2014/0037257 A1 * | 2/2014 | Yang | G02F 1/3137 385/116 |
| 2015/0253433 A1 | 9/2015 | Morse et al. | |
| 2018/0128973 A1 * | 5/2018 | Powell | G02B 6/08 |

* cited by examiner

*Primary Examiner* — Tina M Wong
(74) *Attorney, Agent, or Firm* — Treyz Law Group, P.C.; G. Victor Treyz; Tianyi He

(57) ABSTRACT

An electronic device may have a display, a display cover layer, and a sheet-packed coherent fiber bundle. The coherent fiber bundle may have an input surface that receives an image from the display and a corresponding output surface to which the image is transported. The coherent fiber bundle may be placed between the display and the display cover layer and mounted to a housing. The coherent fiber bundle may have fiber cores with bends that help conceal the housing from view and make the display appear borderless. The coherent fiber bundle has filaments formed from elongated strands of binder in which multiple fiber cores are embedded. Sheets of filaments are stacked and fused together to form the coherent fiber bundle. By aligning and fusing the sheets with respect to each other the filaments are packed with a desired density and uniformity.

19 Claims, 11 Drawing Sheets

ELECTRONIC DEVICES WITH SHEET-PACKED COHERENT FIBER BUNDLES

This application claims the benefit of provisional patent application No. 62/990,375, filed Mar. 16, 2020, which is hereby incorporated by reference herein in its entirety.

FIELD

This relates generally to electronic devices, and, more particularly, to coherent fiber bundles for electronic devices with displays.

BACKGROUND

Electronic devices may have displays. Displays have arrays of pixels for displaying images for a user. To protect sensitive display structures from damage, displays may be provided with display cover layers. Display cover layers may be formed from glass, crystalline materials such as sapphire, or polymer.

SUMMARY

An electronic device may have a display, a display cover layer, and an image transport layer formed from a sheet-packed coherent fiber bundle. The coherent fiber bundle may have an input surface that receives an image from the display and a corresponding output surface to which the image is transported. The coherent fiber bundle may be placed between the display and the display cover layer or the display cover layer may be omitted so that the coherent fiber bundle forms an exterior surface of the electronic device.

In an illustrative configuration, the coherent fiber bundle, the display cover layer, and the display are mounted to a housing having a rear housing wall. Electronic components may be mounted in an interior portion of the electronic device underneath the display and between the display and the rear wall. The coherent fiber bundle may have fiber cores with bends that help conceal the housing from view around the edges of the display and thereby make the display appear borderless.

The coherent fiber bundle has filaments formed from elongated strands of binder. Each filament may include multiple fiber cores. Sheets of filaments are stacked and fused together to form the coherent fiber bundle. By aligning and fusing the sheets with respect to each other, the filaments become packed with a desired density and uniformity in the coherent fiber bundle.

DETAILED DESCRIPTION

An electronic device may have a display. The display may have an array of pixels for creating an image. The image may be visible through transparent structures that overlap the array of pixels. These structures may include an image transport layer such as a coherent fiber bundle overlapped by a clear display cover layer.

The coherent fiber bundle may be included in the electronic device to help minimize display borders or to otherwise create a desired appearance for the display. The coherent fiber bundle may have an input surface that receives an image from an array of pixels and a corresponding output surface to which the image is transported from the input surface. A layer of glass, polymer, or other clear material may be used to form a display cover layer that protects the output surface. A user viewing the electronic device will view the image from the array of pixels as being located on the output surface. In some arrangements, image transport layers formed from coherent fiber bundles and/or protective cover layers can be formed over components other than displays.

In configurations in which the input and output surfaces of an image transport layer such as a coherent fiber bundle have different shapes, the image transport layer may be used to warp the image produced by the array of pixels. For example, the shape of the image can be transformed and the effective size of the image can be changed as the image passes through the image transport layer. In some configurations, edge portions of the image are stretched outwardly to help minimize display borders.

Glass and/or polymer may be used in forming image transport layer structures. Display cover layers for protecting underlying display structures such as pixel arrays and image transport layers may be formed from transparent materials such as glass, clear polymer, or crystalline material such as sapphire.

Figure 1:
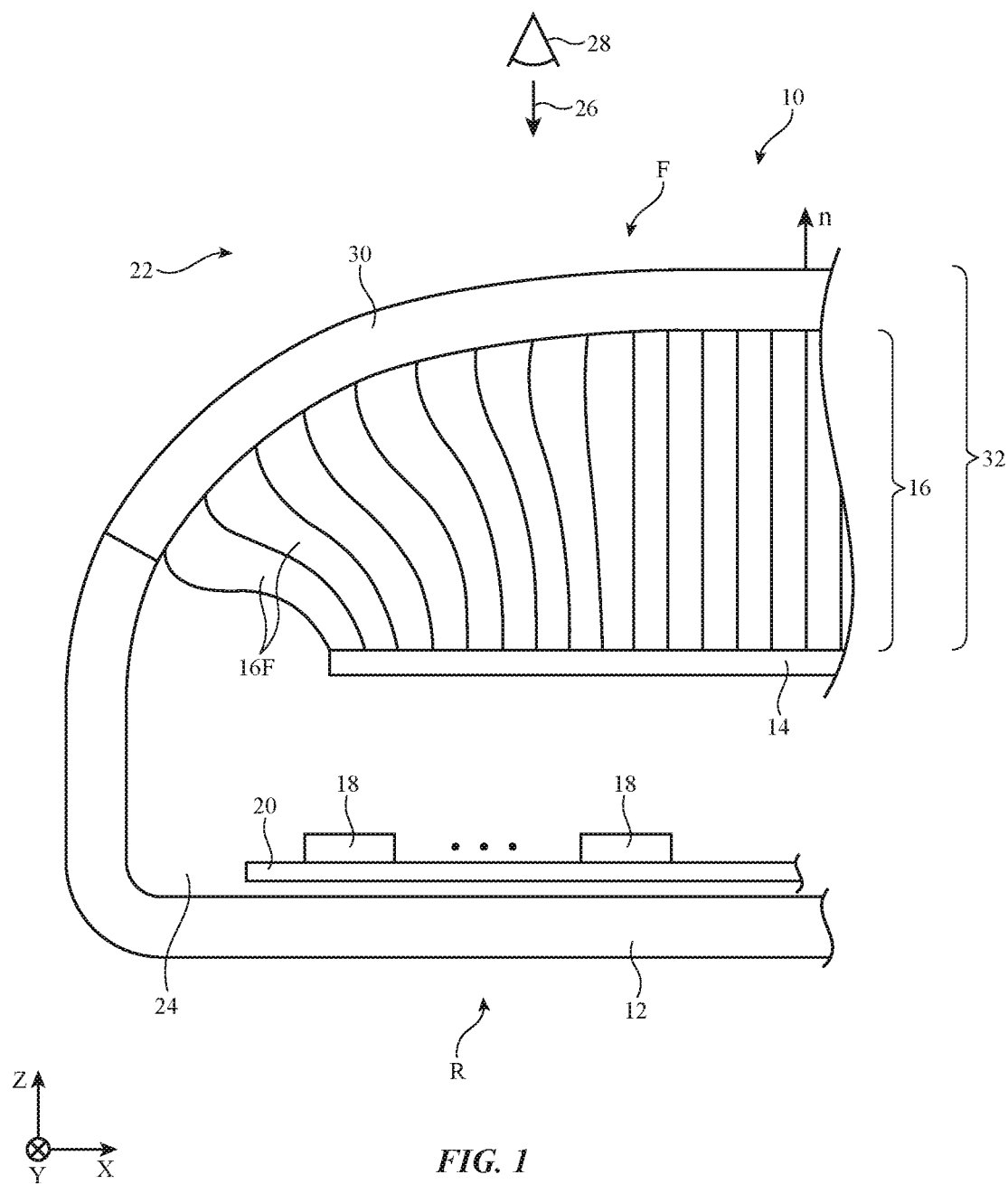
FIG. 1 is a side view of an illustrative electronic device with an image transport layer in accordance with an embodiment.

A cross-sectional side view of a portion of an illustrative electronic device having a display that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. For example, housing 12 may have a rear housing wall on rear face R and this rear housing wall may separate interior region 24 from the exterior region. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output. Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with light-emitting diodes formed from respective crystalline light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer, protective cover layer structures, etc.).

In the example of FIG. 1, display (pixel array) 14 is mounted under protective layer(s) 32. Layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, layer 32 may include image transport layer 16 and display cover layer 30. Display cover layer 30 serves as a protective outer layer for device 10 and display 14. Display cover layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted and layer 16 may serve as a protective display cover layer (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (e.g., the bends in fibers 16F along their lengths and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 (e.g., the periphery of housing 12) from view. This helps make the display of device 10 appear borderless to viewer 28. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
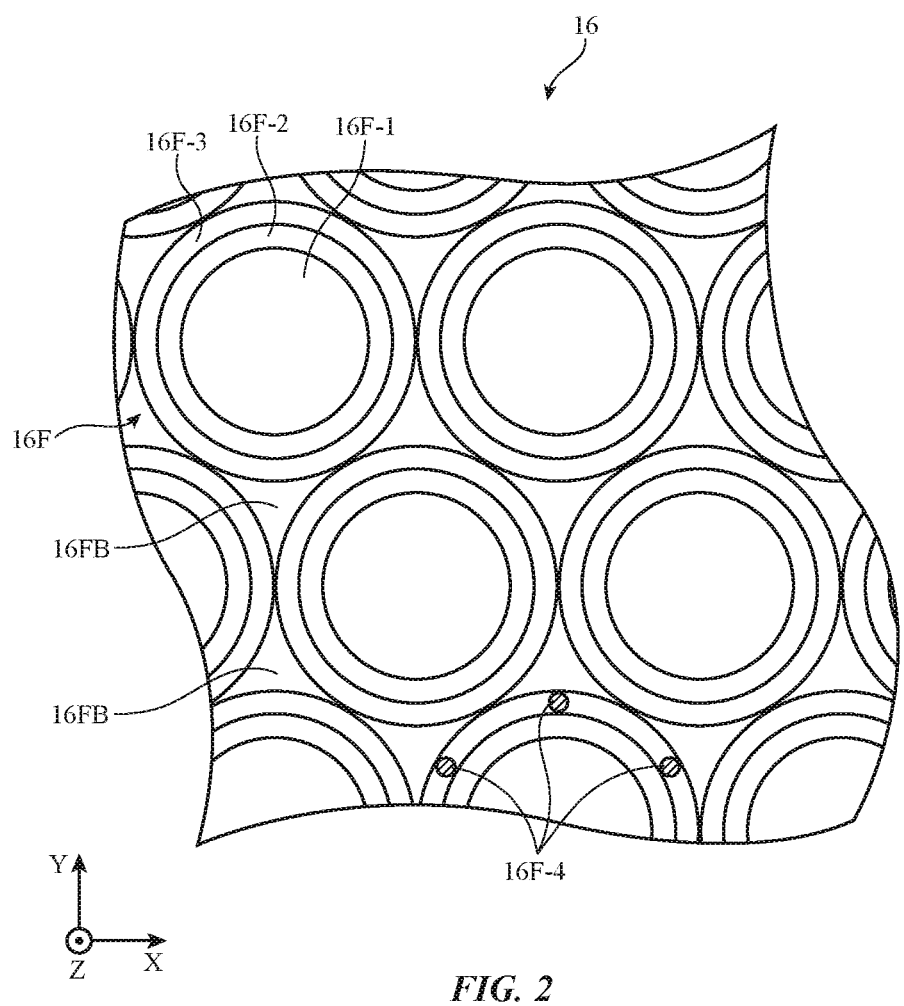
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers and join fibers 16F together. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are formed directly in binder 16FB without any intervening cladding, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material, lower than the refractive index of the cladding material to promote total internal reflection, or higher than the refractive index of the cladding material (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower (or higher) than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

Figure 3:
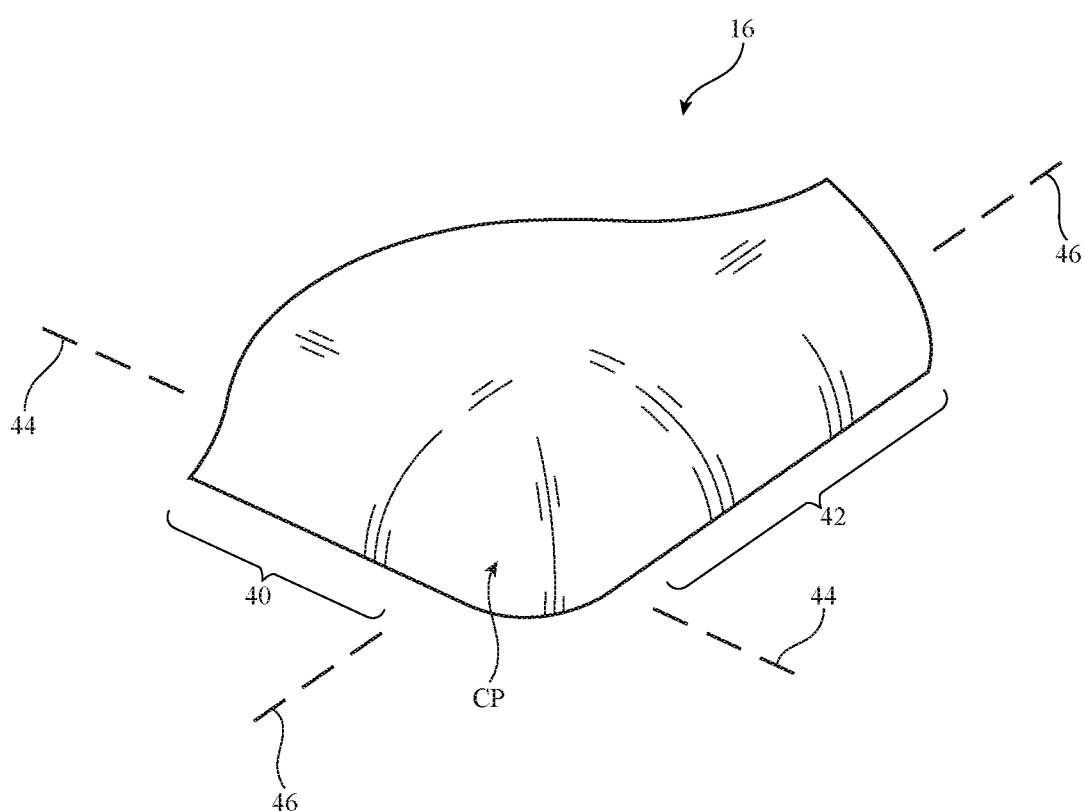
FIG. 3 is a perspective view of a portion of an image transport layer surface with compound curvature in accordance with an embodiment.

Image transport layers can be used to transport an image from a first (input) surface (e.g., the surface of a pixel array) to a second (output) surface (e.g., a surface in device 10 with compound curvature or other curved and/or planar surface shape) while preserving the integrity of the image. A perspective view of an illustrative corner portion of image transport layer 16 is shown in FIG. 3. In the example of FIG. 3, layer 16 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 3, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces, an edge surface of compound curvature that runs along the circular periphery of a central circular planar region, etc.). When overlapped by layer 30, the overlapping portions of layer 30 may have corresponding surfaces with compound curvature. When selecting the size and shape of the output surface of layer 16 and therefore the size and shape of the image presented on the output surface, the use of an image transport layer material with compound curvature can provide design flexibility. In general, layer 30 and layer 16 may have planar surfaces and/or surfaces with curved cross-sectional profiles.

Figure 4:
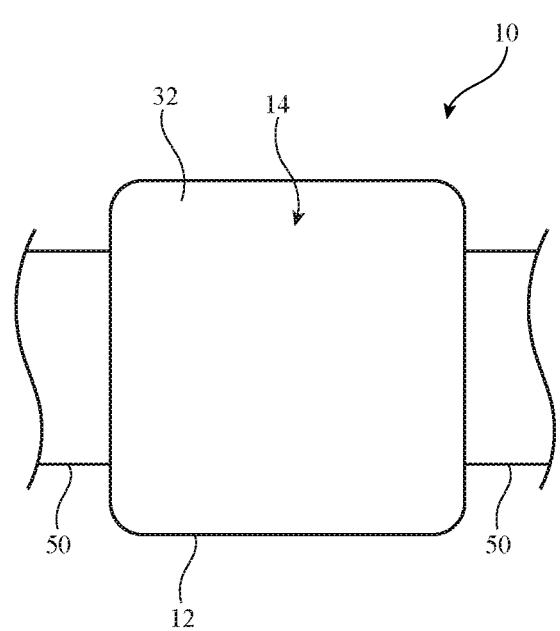
FIG. 4 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 4. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

Figure 5:
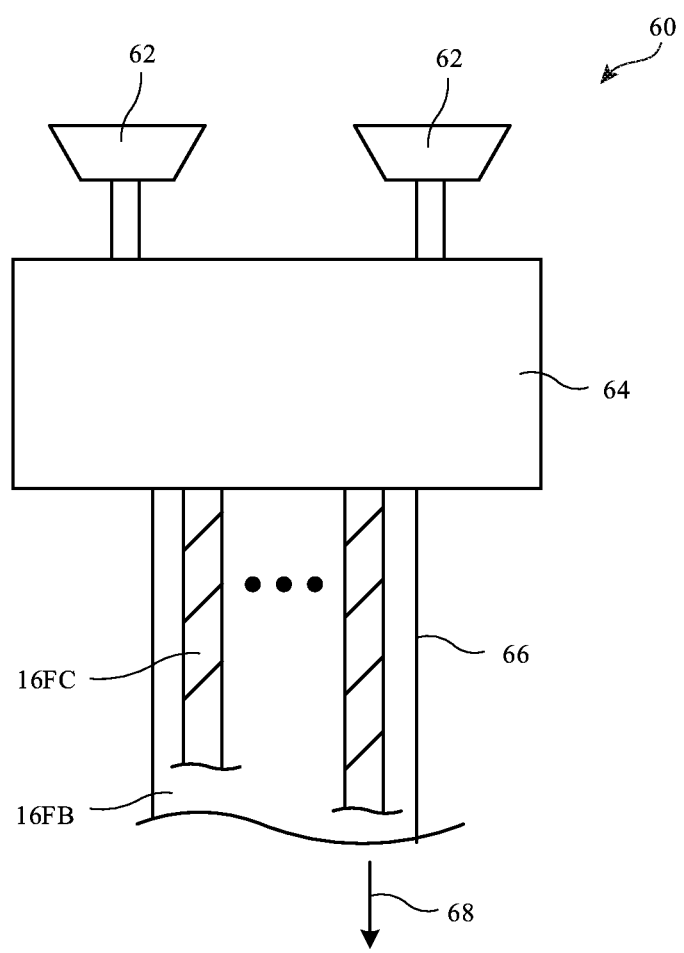
FIG. 5 is a side view of illustrative equipment for forming filaments from elongated strands of binder with embedded fiber cores in accordance with an embodiment.

If desired, image transport layer material may be formed from filaments of material each of which include multiple fiber cores. Filaments may, as an example, be formed using an extrusion process. An illustrative extrusion tool for forming filaments of image transport layer material is shown in FIG. 5. As shown in FIG. 5, extruder 60 may include hoppers 62 that contain different types of material to be extruded (e.g., different polymers such as binder polymer and fiber core polymer). The material from hoppers 62 may be provided to coextrusion die set 64. During coextrusion, the material from hoppers 62 is coextruded through extrusion die set 64 and forms one or more elongated extruded members such as extruded filament 66, which exits extrusion die set 64 in direction 68. In the example of FIG. 5, filament 66 includes multiple fiber cores 16FC (see, e.g., cores 16-1 of FIG. 2) embedded in an elongated strand of binder 16FB (see, e.g., binder 16FB of FIG. 2). A single filament 66 is being extruded from extrusion die set 64 in FIG. 5. If desired, multiple filaments 66 may be extruded in parallel from die set 64 (e.g., to form bundles of filaments 66 at the output of die set 64). In such configurations, filaments 66 may be debundled prior to subsequent operations (e.g., before fusing a layer of filaments 66 together to form a sheet of image transport layer material).

As shown in FIG. 5, extrusion die set 64 may include one or more layers with channels configured to distribute fiber core material into multiple cores 16FC embedded in binder 16FB during extrusion. Filaments such as filament 66 may have circular cross-sectional shapes and may contain any suitable number of fiber cores 16FC (e.g., at least 3 fiber cores 16FC, at least 10 fiber cores 16FC, at least 30 fiber cores 16FC, at least 100 fiber cores 16FC, at least 500 fiber cores 16FC, at least 2500 fiber cores 16FC, less than 20,000 fiber cores 16FC, less than 4000 fiber cores 16FC, less than 500 fiber cores 16FC, less than 100 fiber cores 16FC, and/or other suitable number of fiber cores 16FC).

When it is desired to join the filaments produced by extruder 60 (e.g., extruded strands such as multi-core filament 66 of FIG. 5 or other elongated polymer members), the filaments may be placed in fusion equipment, which fuses the filaments by applying heat and pressure (e.g., heat and pressure that helps fuse the binder material of the filaments together). In-line fusion tools (e.g., fusers with rollers), laser-fusion equipment, fusion equipment that involves wrapping filaments into channels using computer-controlled equipment that maintains desired angular orientations and tensions computer-controlled, and/or other illustrative fusing tools may be used to fuse filaments together to form image transport layer material.

To help ensure satisfactory alignment of filaments 66 with respect to each other during fusion (and therefore ensure satisfactory alignment of fiber cores 16FC in image transport layer 16 and a desired low level of visual artifacts in the coherent fiber bundle), it may be desirable to fuse a single layer of filaments 66 together to form a filament sheet (sometimes referred to as a coherent fiber bundle sheet, a sheet of filaments, a sheet of image transport layer material, etc.). Multiple sheets can then be stacked and fused to form a coherent fiber bundle in which filaments are packed together with a desired filament alignment and density. Such coherent fiber bundle material, which may sometimes be referred to as sheet-packed coherent fiber bundle material, sheet-packed image transport layer material, sheet-stacked image transport layer material, a sheet-packed coherent fiber bundle, etc., may exhibit satisfactory image transport qualities (e.g., low amounts of visual artifacts).

Figure 6:
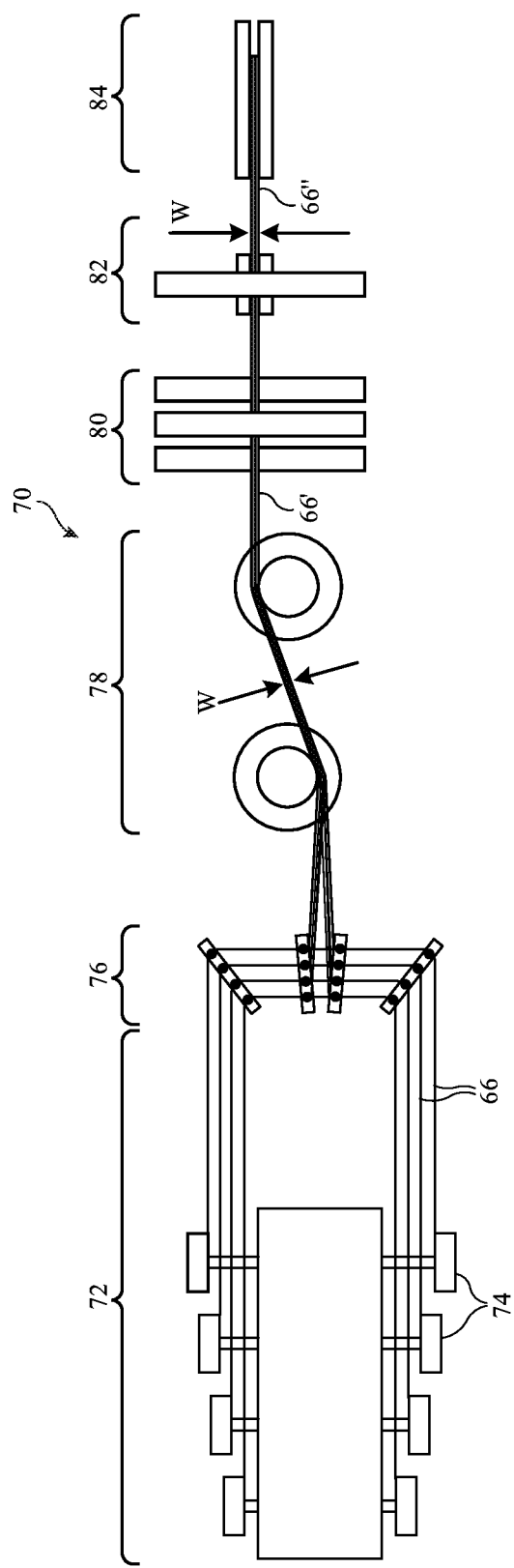
FIG. 6 is a side view of illustrative equipment for forming sheets of fused filaments for an image transport layer in accordance with an embodiment.

Sheets of image transport layer material (e.g., sheets of fused filaments) can be formed using equipment of the type shown in FIG. 6 (as an example). FIG. 6 is a cross-sectional view of an illustrative fusion tool for producing fused filament sheets. As shown in FIG. 6, tool 70 may include filament source 72. Filament source 72 may include multiple single-filament spools 74, each of which may dispense a respective multi-core filament 66 (see, e.g., filament 66 of FIG. 5). Each spool 74 may be mounted on a tension controlling dancer arm and may have a respective separate computer-controlled motor. In configurations in which extruder 60 produces bundles of filaments 66, debundling equipment may be used to separate bundles of filaments 66 into individual filaments 66 each of which may be stored on a respective one of spools 74.

Guide bars 76 may be used to distribute a layer of multiple parallel filaments 66 to one or more aligning wheels 78. Guide bars 76 may have smooth guide rollers to help reduce friction. Aligning wheels 78 may include springs and/or other tensioning mechanisms and may have a tunable wheel gap to receive and align filaments 66. As filaments 66 pass through wheels 78, filaments 66 are aligned so as to form a sheet 66' of aligned unfused filaments of width W. Unfused filament sheet 66' may be passed through a series of interleaved vertically oriented tensioning rods 80 that can be adjusted to increase or decrease friction and therefore control sheet tension.

Rollers 82, which may sometimes be referred to as fusion rollers or pre-fusion rollers, apply heat and/or pressure to the filaments of sheet 66' to form a sheet of joined (e.g., fused) filaments 66. This fused sheet of filaments (fused filament sheet 66") may be received by a take-up system such as bobbin 84. Subsequent fusing operations on bobbin 84 or in separate fusing equipment may be used to form a block of sheet-packed coherent fiber bundle material from multiple stacked filament sheets.

Figure 7:
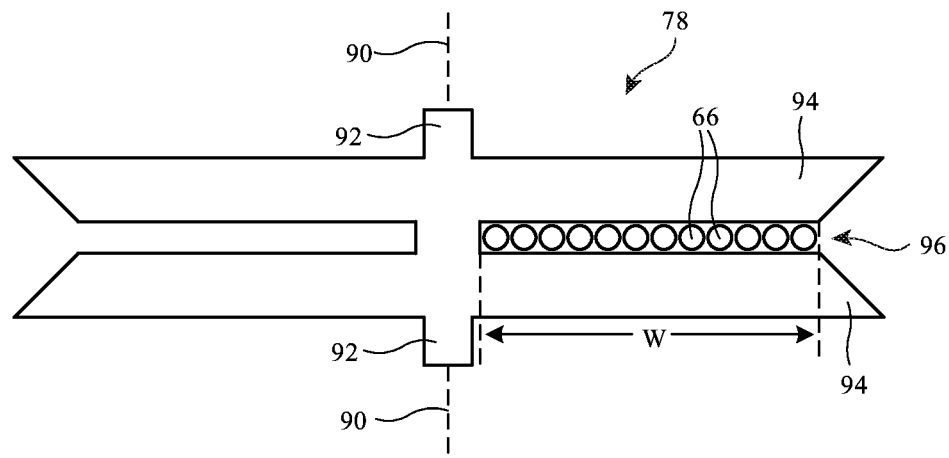
FIG. 7 is a cross-sectional view of an illustrative alignment wheel for use in equipment that forms filament sheets such as the illustrative equipment of FIG. 6 in accordance with an embodiment.

FIG. 7 is a cross-sectional side view of an illustrative alignment wheel for tool 70. As shown in FIG. 7, alignment wheel 78 may have a pair of parallel disc-shaped wheel members 94 mounted on a common shaft such as shaft 92. During operation, wheel 78 rotates about axis 90, which is aligned with shaft 92. Wheel members 94 may be separated by a gap 96 that is configured to accept only a single layer of filaments 66. This ensures that filaments 66 will be aligned in a planar array (in a row) to form a planar filament sheet when passing through wheel 78.

Figure 8:
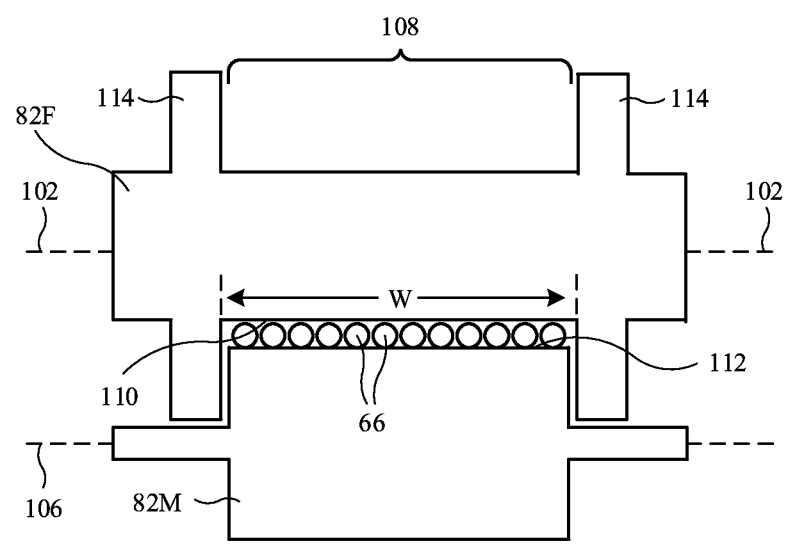
FIG. 8 is a cross-sectional view of illustrative sheet fusing rollers for use in equipment that forms filament sheets such as the illustrative equipment of FIG. 6 in accordance with an embodiment.

Fusion rollers 82 may include mating rollers such as roller 82M and roller 82F of FIG. 8. Roller 82F may rotate about axis 102 as roller 82M rotates in the opposite direction about axis 106. Roller 82M protrudes into gap 108 between roller side walls 114 of roller 82F, so that filaments 66 are compressed between surface 110 of roller 82F and opposing surface 112 of roller 82M. By applying heat and/or pressure while filaments 66 pass through rollers 82F and 82M, filaments 66 of unfused sheet 66' are joined to form joined (fused) filaments 66 of fused sheet 66".

Figure 9:
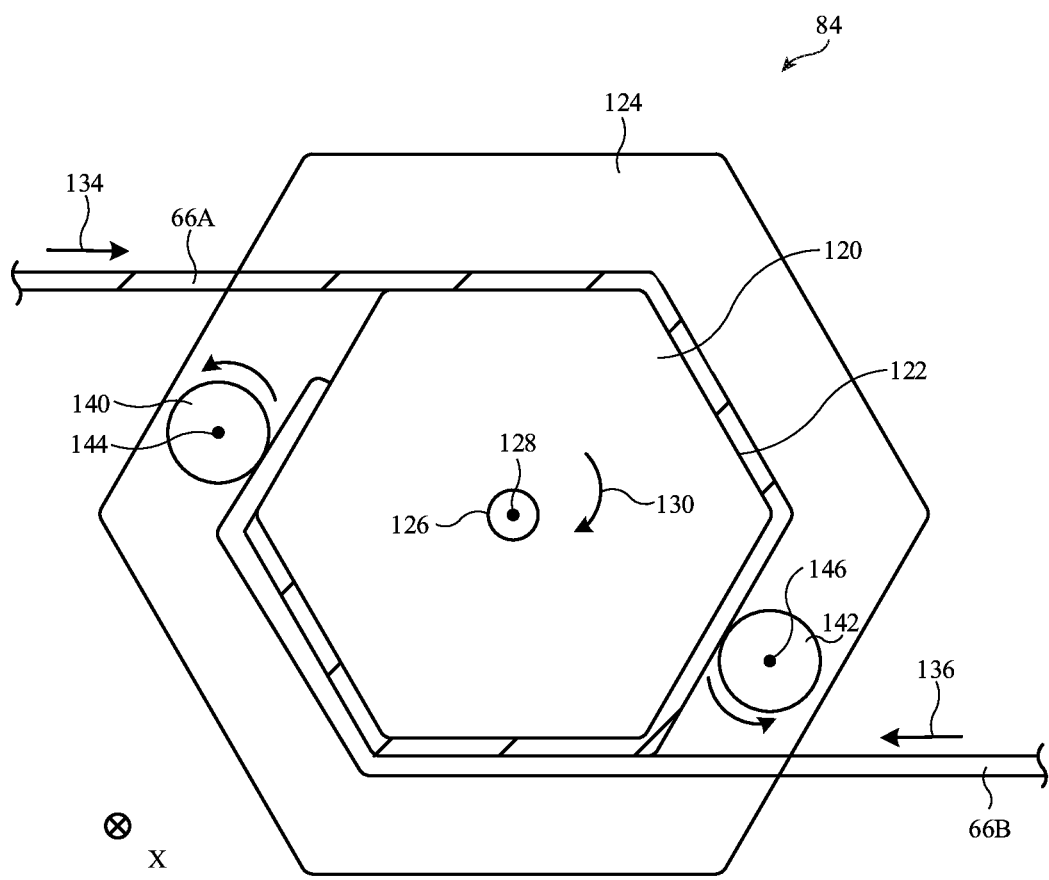
FIG. 9 is a cross-sectional side view of an illustrative bobbin with channels into which sheets of filaments may be placed during sheet packing operations in accordance with an embodiment.

FIG. 9 is a cross-sectional side view of bobbin 84 of FIG. 6. As shown in FIG. 9, bobbin 84 may have non-circular take-up wheel 120 that rotates on shaft 126 about rotational axis 128 in direction 130. Wheel 120 may, for example, have a hexagonal or octagonal shape (as examples). Flat surfaces 122 of wheel 120 allow sheets 66" to be stacked to form blocks of filaments 66, where filaments 66 are straight and run parallel to each other. For example, a hexagonal shape for wheel 120 may allow six sections of coherent fiber bundle material to be formed each of which contains a respective set of parallel filaments 66. Bobbin 84 may have guide walls 124 that help laterally align (into and out of the page in the orientation of FIG. 9) the sheets of fused filaments 66 being wound onto wheel 120.

One or more sheets of filaments 66 may be wound onto wheel 120. In the example of FIG. 9, a first fused filament sheet (sheet 66A) is being fed in direction 134 onto bobbin 84 while a second fused filament sheet (sheet 66B, which may be laterally offset along dimension X by half of a filament diameter with respect to sheet 66A) is being fed in direction 136 onto bobbin 84. Pinch rollers 140 and 142, which may be mounted on movable spring-loaded dancer arms, rotate about respective axes 144 and 146 while pressing inwardly on filaments 66 toward surfaces 122. In this way, pinch rollers 140 and 142 hold previously wound sheets of filaments 66 flat to prevent buckling and thereby ensure satisfactory winding and alignment of subsequently stacked layers of filaments.

Figure 10:
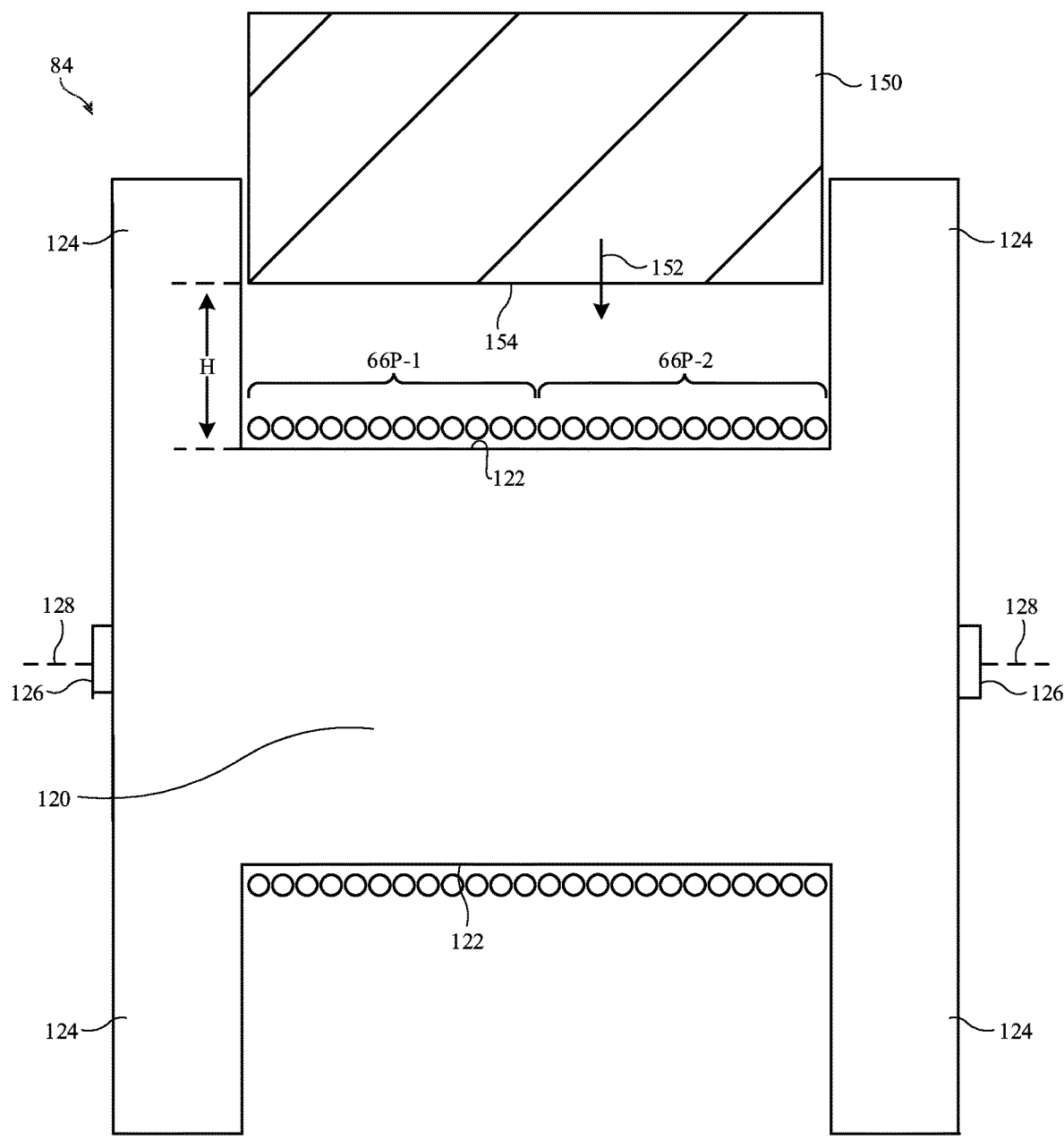
FIG. 10 is a cross-sectional view of an illustrative bobbin and associated sheets of filaments in accordance with an embodiment.

FIG. 10 is a cross-sectional side view of bobbin 84 showing how multiple sub-sheets may be wound around wheel 120 into the channels formed between guide walls 124. In the example of FIG. 10, a sheet of filaments on surface 122 of wheel 120 has been formed by winding a first sheet portion 66P-1 onto one half of wheel 120 and a second sheet portion 66P-2 onto an adjacent second half of wheel 120. There may be three or more laterally adjacent sheet portions that are wound onto wheel 120 in this way, if desired. Multiple sheet portions may be wound onto wheel 120 simultaneously (to deposit three laterally adjacent sheet portions at the same time), laterally adjacent stack portions may be deposited in series, multiple laterally adjacent sheet portion stacks may be formed one after the next, or other patterns of sheet winding may be used to when stacking sheets of filaments 66 onto wheel 120.

After filaments 66 have been stacked to a desired thickness H (e.g., a height equal to the total sheet width or other suitable size), filaments 66 may be fused under vacuum to form a block of image transport layer material. If desired, the channels of bobbin 84 may receive respective heated dies such as die 150. Dies such as die 150 may press inwardly in direction 152 against the stacked sheets of filaments 66 so that filaments 66 are compressed between inwardly facing planar surface 154 of die 150 and outwardly facing planar surface 122 of wheel 120, while being laterally constrained (along dimension X) by the inner surfaces of guide walls 124. In this type of configuration, bobbin 84 serves as a fusion tool. If desired, sheets 66" may be divided into individual planar sheets (e.g., using a sheet slicing tool that cuts rectangular fused sheets from a continuous strip of fused sheet material at the exit to fusion rollers 84 of FIG. 6). When individual planar sheets of fused fibers are formed in this way, a die with a rectangular cavity (or other suitable cavity shape) may receive a set of stacked planar sheets and may pack and fuse these sheets using heat and pressure to form a block of sheet-packed coherent fiber bundle material.

By forming image transport layer material from alternating layers of laterally offset filament sheets, filaments 66 may be packed with a desired density and alignment to ensure satisfactory image quality. An illustrative arrangement for aligning sheets of filaments while forming sheet-packed coherent fiber bundle material is shown in FIGS. 11 and 12.

Figure 11:
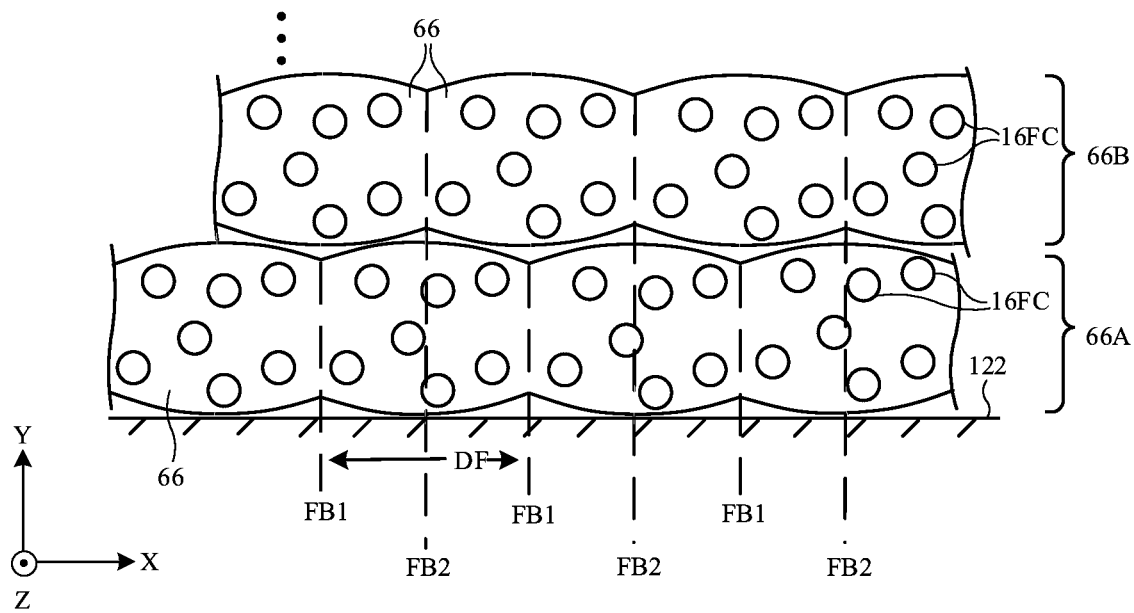
FIG. 11 is a diagram of an illustrative pair of adjacent sheets of filaments showing how sheet-packed coherent fiber bundle material may be formed in accordance with an embodiment.
Figure 12:
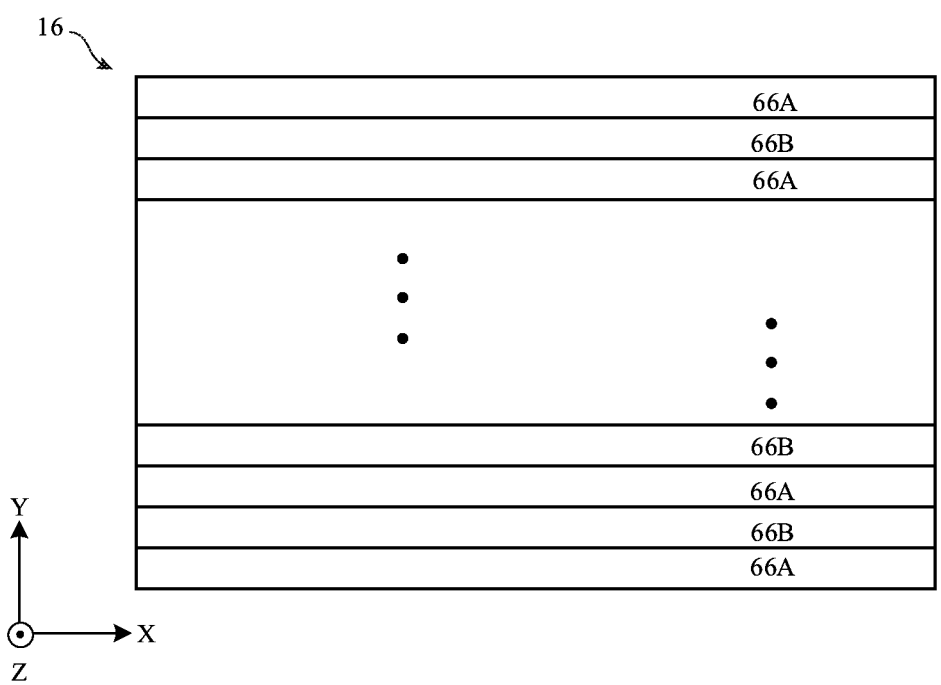
FIG. 12 is a cross-sectional side view of an illustrative sheet-packed coherent fiber bundle in accordance with an embodiment.

FIG. 11 is a cross-sectional side view of two laterally shifted sheets of filaments 66. The first sheet (e.g., odd sheet 66A) has a planar layer of fused filaments 66, each of which contains multiple fiber cores 16FC. The surface of sheet 66A may be planar and/or may have residual protrusions associated with the individual filaments 66 that were joined together to form sheet 66A. Similarly, the second sheet of FIG. 11 (even sheet 66B) has a planar layer of fused filaments 66, each of which contains multiple fiber cores 16FC.

Sheets 66A and 66B (and subsequent odd and even filament sheets formed on top of these sheets in alternation) may be oriented with respect to each other during stacking to help pack filaments 66 densely and in accurate alignment. In particular, each sheet that is wound onto surface 122 of bobbin 84 may have filaments that are laterally offset (filament centers that are laterally offset) with respect to each other along dimension X (parallel to rotational axis 128 of bobbin 84 and wheel 120). It may also be desirable for sheets 66A and 66B to have different numbers of filaments. For example, if sheet 66A has N filaments 66, sheet 66B may have N−1 filaments to help align filaments 66 of sheet 66B appropriately with respect to the edges of sheet 66A (e.g., avoiding overhang along the sheet edge).

As shown in the example of FIG. 11, sheet 66A is formed from fused filaments 66 that are joined (e.g., fused) along boundaries FB1, whereas sheet 66B is formed from fused filaments 66 that are joined (e.g., fused) along boundaries FB2. To help reduce voids and ensure satisfactorily alignment, sheet 66B is laterally offset (along dimension X across the width of sheet 66A) with respect to sheet 66A by half of the distance DF between a pair of adjacent filament boundaries FB1. This distance DF/2 is approximately equal to the radius of filaments 66 and is equal to half of the distance between adjacent filament boundaries FB2 in sheet 66B. In a coherent fiber bundle in which even and odd sheets of filaments alternate, the filament centers of the filaments of the even sheets and the filament centers of the filaments of the odd sheets are laterally offset in this way (e.g., the filament centers of alternating odd and even sheets are offset by DF/2 with respect to each other, which is equal to half of the filament-center-to-filament-center distance of the filaments in both types of sheets). At the same time, the filament centers of the even sheets are laterally aligned with respect to each other and the filament centers of the odd sheets are laterally aligned with respect to each other.

As shown in FIG. 12, a coherent fiber bundle (e.g., image transport layer 16) may be formed by fusing together filaments 66 that are packed together in a stack where sheets 66A alternate with laterally offset sheets 66B. With this sheet packing arrangements, one of even sheets 66B is formed between each pair of odd sheets 66A. The filaments of each sheet are laterally offset by DF/2 with respect to the filaments of the proceeding sheet in the stack. By laterally offsetting the filament centers of odd filament sheets by half of a filament diameter with respect to the filament centers of even filament sheets in this way, filaments 66 may be densely packed and accurately fused together with a desirably small amount of misalignment (waviness) along their lengths. Sheet-packed coherent fiber bundle material may then be thermally deformed (e.g., to form fiber bends of the type shown in FIG. 1) and machined and polished to form image transport layer 16.

Figure 13:
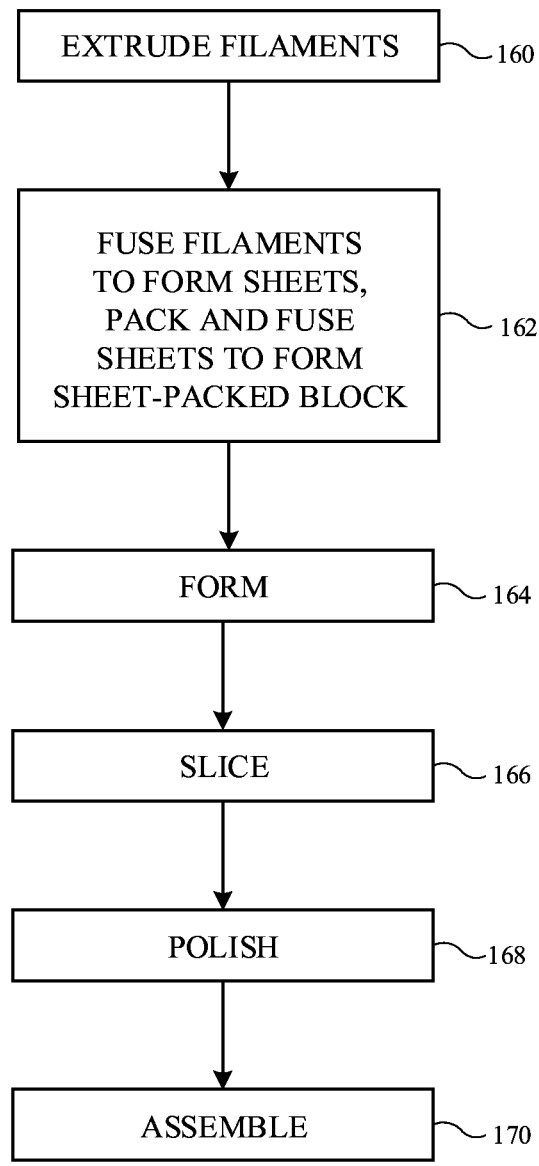
FIG. 13 is a flow chart of illustrative operations involved in forming an electronic device with a sheet-packed coherent fiber bundle in accordance with an embodiment.

Illustrative operations in forming sheet-packed coherent fiber bundle material for device 10 are shown in FIG. 13. During the operations of block 160, a tool such as extrusion tool 60 may be used to extrude multi-core filaments such as filament 66. Each filament may include multiple fiber cores 16FC embedded in an elongated strand of binder 16FB. The diameter of each filament 66 may be, for example, 100 microns, at least 20 microns, at least 60 microns, less than 150 microns, less than 500 microns, or other suitable size. Filaments 66 may be gathered on single-filament spools or may be gathered on spools in multi-filament bundles that are subsequently debundled into individual filaments 66 for source 72 of tool 70 (FIG. 6).

During the operations of block 162, filaments 66 are fused or otherwise joined into sheets such as fused sheet 66" (e.g., using fusion rollers 82 of FIG. 6). Alternating laterally offset sheets of filaments 66A and 66B are wound onto bobbin 84 and heat and pressure is applied (e.g., using die 150 of FIG. 10) to form a sheet-packed coherent fiber bundle.

During the operations of block 164, the sheet-packed coherent fiber bundle may be optionally deformed (thermally formed) by applying heat and pressure (e.g., in a heated mold). For example, the coherent fiber bundle (e.g., the block of image transport layer material formed from filaments 66) can be squeezed together so as to deform fiber cores 16FC and cause fiber cores 16FC to exhibit one or more bends along their lengths as shown in FIG. 1.

During the operations of block 166, a saw or other equipment may be used to slice a layer of image transport layer material from the deformed image transport layer block.

This layer may, during the operations of block 168, be shaped using grinding tools, polishing tools, and/or other equipment to form a finished version of image transport layer 16 (see, e.g., layer 16 of FIG. 1).

During the operations of block 170, display cover layer 30, the polished sheet-packed coherent fiber bundle (image transport layer 16), display 14, and other structures may be assembled into housing 12 to form electronic device 10. For example, layers such as layers 30 and 16 and display 14 may be joined using layers of adhesive. Display 14, layer 30, layer 16, and associated support structures and internal components can be coupled to housing 12 using adhesive, fasteners (e.g., screws), welds, press-fit joints, flexible engagement structures (e.g., springs, clips, etc.), and/or may be mounted to housing 12 using other mounting structures.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a display configured to produce an image; and
a sheet-packed coherent fiber bundle overlapping the display, wherein the sheet-packed coherent fiber bundle is configured to receive the image at an input surface and to transport the received image to an output surface, wherein the sheet-packed coherent fiber bundle comprises fused filaments each of which has multiple fiber cores.

2. The electronic device defined in claim 1 wherein the sheet-packed coherent fiber bundle has fused sheets of filaments.

3. The electronic device defined in claim 2 wherein each sheet of filaments includes multiple filaments having respective filament centers and wherein the filament centers of alternating sheets in the sheet-packed coherent fiber bundle are laterally offset with respect to each other.

4. The electronic device defined in claim 3 wherein the filament centers of the filaments of odd sheets are laterally offset by half of a filament-center-to-filament-center spacing of the filaments of even sheets.

5. The electronic device defined in claim 4 wherein each filament has multiple fiber cores.

6. The electronic device defined in claim 5 wherein the fiber cores of each filament are embedded directly in binder material without intervening coating material.

7. The electronic device defined in claim 5 wherein each fiber core is surrounded by at least one coating layer and wherein the fiber cores with the coating layers are embedded in binder material.

8. The electronic device defined in claim 1 further comprising:
a housing in which the display is mounted; and
electrical components between the housing and the display, wherein the sheet-packed coherent fiber bundle is configured to visually hide the housing so that the display appears borderless.

9. The electronic device defined in claim 1 wherein the fiber cores include fiber cores with multiple bends.

10. An electronic device, comprising:
a display configured to produce an image; and
a stack of fused filament sheets forming a coherent fiber bundle that overlaps the display, wherein the filament sheets comprise filaments and wherein each filament comprises an elongated strand of binder that contains multiple fiber cores.

11. The electronic device defined in claim 10 wherein the fiber cores include fiber cores that have bends.

12. The electronic device defined in claim 11 wherein the coherent fiber bundle is configured to receive the image at an input surface and to transport the received image to an output surface.

13. The electronic device defined in claim 10 wherein the filaments of each filament sheet have respective filament centers, wherein first filament sheets alternate with second filament sheets in the stack of filament sheets, and wherein the filament centers of the first filament sheets are offset with respect to the filament centers of the second filament sheets.

14. The electronic device defined in claim 13 wherein the fiber cores include fiber cores that have bends.

15. The electronic device defined in claim 14 wherein the filament centers of the first sheets in the coherent fiber bundle are laterally offset with respect to the filament centers of the second sheets in the coherent fiber bundle by a distance equal to half of a filament-center-to-filament-center spacing in the first sheets.

16. The electronic device defined in claim 15 wherein the filament centers of the first sheets in the coherent fiber bundle are laterally aligned with respect to each other.

17. An electronic device, comprising:
a display configured to produce an image;
a transparent display cover layer; and
a sheet-packed coherent fiber bundle between the display and the transparent display cover layer, wherein the sheet-packed coherent fiber bundle is configured to receive the image at an input surface and to transport the received image to an output surface and wherein the sheet-packed coherent fiber bundle has a plurality of fused filament sheets, each filament sheet having multiple fused filaments that include fiber cores.

18. The electronic device defined in claim 17, wherein each filament comprises a plurality of the fiber cores.

19. The electronic device defined in claim 18 wherein the fiber cores include fiber cores with bends.

* * * * *